United States Patent
Channabasavaiah et al.

(10) Patent No.: US 8,244,847 B2
(45) Date of Patent: Aug. 14, 2012

(54) MANAGEMENT OF A SERVICE ORIENTED ARCHITECTURE SHARED SERVICE

(75) Inventors: Kishore Channabasavaiah, Palatine, IL (US); Stephen C. Kendrick, Fairfax, VA (US); Sri Ramanathan, Lutz, FL (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 12/393,110

(22) Filed: Feb. 26, 2009

(65) Prior Publication Data

US 2010/0217636 A1    Aug. 26, 2010

(51) Int. Cl.
*G06F 15/173* (2006.01)
(52) U.S. Cl. ........................................................ 709/223
(58) Field of Classification Search .......... 709/217–219, 709/223
See application file for complete search history.

(56) References Cited

U.S. PATENT DOCUMENTS

| | | | |
|---|---|---|---|
| 2004/0093381 A1 | 5/2004 | Hodges et al. | |
| 2006/0059253 A1 | 3/2006 | Goodman et al. | |
| 2006/0235733 A1 | 10/2006 | Marks | |
| 2007/0022404 A1 | 1/2007 | Zhang et al. | |
| 2008/0028365 A1* | 1/2008 | Erl | 717/105 |
| 2008/0066048 A1 | 3/2008 | Hafermann et al. | |
| 2008/0077652 A1 | 3/2008 | Grant et al. | |
| 2008/0140857 A1* | 6/2008 | Conner et al. | 709/236 |
| 2008/0163253 A1* | 7/2008 | Massmann et al. | 719/316 |
| 2008/0250386 A1* | 10/2008 | Erl | 717/100 |
| 2009/0132708 A1* | 5/2009 | Hayward | 709/226 |

FOREIGN PATENT DOCUMENTS

| | | | |
|---|---|---|---|
| JP | 2006099162 A | 4/2006 | |
| WO | 2008011122 A2 | 1/2008 | |

* cited by examiner

*Primary Examiner* — Jason Recek
(74) *Attorney, Agent, or Firm* — Anna L. Linne; Ronald A. D'Alessandro; Keohane & D'Alessandro PLLC

(57) ABSTRACT

An approach that manages a service oriented architecture (SOA) shared service is provided. In one embodiment, there is a service management tool, including an identification component configured to identify a SOA shared service that needs to be revised; and a revision component configured to develop a revision procedure to address the SOA shared service that needs to be revised, and implement the revision procedure for the SOA shared service.

20 Claims, 6 Drawing Sheets

MANAGEMENT OF A SERVICE ORIENTED ARCHITECTURE SHARED SERVICE

CROSS-REFERENCE TO RELATED APPLICATION

The present application is related in some aspects to commonly owned and co-pending application entitled "Identification of a Service Oriented Architecture Shared Services Project", which was filed on Nov. 24, 2008, and was assigned application Ser. No. 12/277,280, commonly owned and co-pending application entitled "Evaluating a Service Oriented Architecture Shared Services Project", which was filed on Feb. 19, 2009, and was assigned application Ser. No. 12/388,533, commonly owned and co-pending application entitled "Selecting a Service Oriented Architecture Shared Service", which was filed on Feb. 24, 2009, and was assigned application Ser. No. 12/391,426, commonly owned and co-pending application entitled "Designing a Service Specific Service Oriented Architecture Shared Service Solution", which was filed on Feb. 24, 2009, and was assigned application Ser. No. 12/391,728, commonly owned and co-pending application entitled "Constructing a Service Oriented Architecture Shared Service", which was filed on Feb. 25, 2009, and was assigned application Ser. No. 12/392,189, commonly owned and co-pending application entitled "Transitioning to Management of a Service Oriented Architecture Shared Service", which was filed on Feb. 25, 2009, and was assigned application Ser. No. 12/391,728, commonly owned and co-pending application entitled "Managing Service Oriented Architecture (SOA) Shared Service Escalation", which was filed on Feb. 24, 2009, and was assigned application Ser. No. 12/391,362, the entire contents of which are herein incorporated by reference.

FIELD OF THE INVENTION

This invention relates generally to lifecycle management and more specifically to the management of SOA shared services.

BACKGROUND OF THE INVENTION

In the past, software architectures have attempted to deal with increasing levels of software complexity. As the level of complexity continues to increase, traditional architectures are reaching the limit of their ability to deal with various problems. At the same time, traditional needs of information technology (IT) organizations persist. IT organizations need to respond quickly to new requirements of the business, while continuing to reduce the cost of IT to the business by absorbing and integrating new business partners, new business sets, etc.

Current IT lifecycle processes are configured to managing self-contained and siloed solutions. However, as businesses transition to service oriented architectures (SOA), traditional IT governance methods are inadequate at managing SOA shared services during their entire lifecycle. SOA is not a self-contained and siloed solution; rather it's a decomposition of solutions into a set of shared services. It is these SOA shared services that require a new lifecycle management system, which takes into consideration multiple new processes that are not available or part of existing IT governance systems.

SUMMARY OF THE INVENTION

In one embodiment, there is a method for managing a service oriented architecture (SOA) shared service. In this embodiment, the method comprises: identifying a SOA shared service that is in need of a revision; developing a revision procedure to address the SOA shared service; and implementing the revision procedure for the SOA shared service.

In a second embodiment, there is a system for managing a service oriented architecture (SOA) shared service. In this embodiment, the system comprises at least one processing unit, and memory operably associated with the at least one processing unit. A service management tool is storable in memory and executable by the at least one processing unit. The service management tool comprises: an identification component configured to identify a SOA shared service that is in need of a revision; and a revision component configured to develop a revision procedure to address the SOA shared service, and implement the revision procedure for the SOA shared service.

In a third embodiment, there is a computer-readable medium storing computer instructions, which when executed, enables a computer system to manage a service oriented architecture (SOA) shared service, the computer instructions comprising: identifying a SOA shared service that is in need of a revision; developing a revision procedure to address the SOA shared service; and implementing the revision procedure for the SOA shared service.

In a fourth embodiment, there is a method for deploying a service management tool for use in a computer system that provides management of a service oriented architecture (SOA) shared service. In this embodiment, a computer infrastructure is provided and is operable to: identify a SOA shared service that is in need of a revision; develop a revision procedure to address the SOA shared service; and implement the revision procedure for the SOA shared service.

Figure 1:
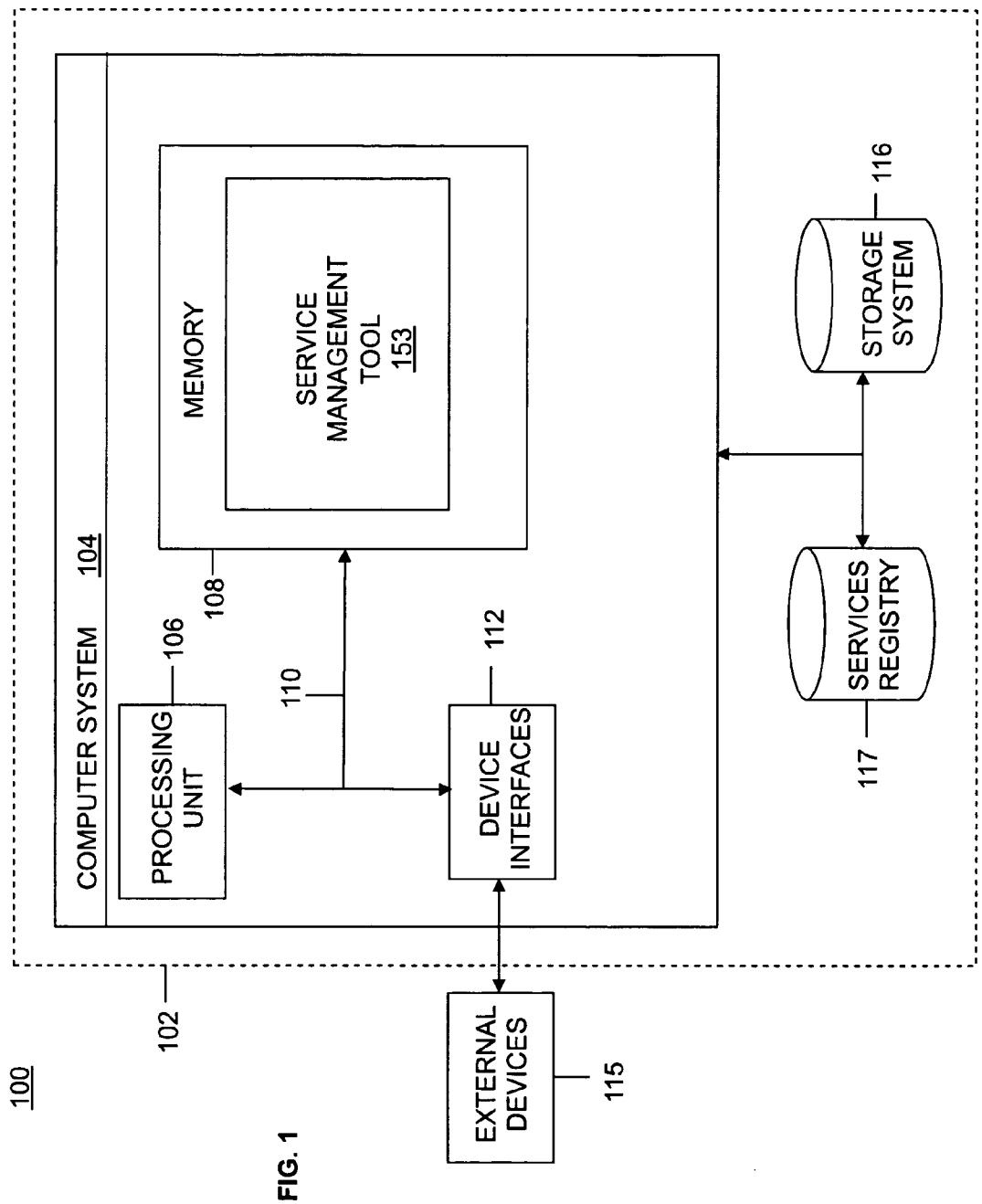
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to managing a service oriented architecture (SOA) shared service. In these embodiments, a service management tool provides this capability. Specifically, the service management tool comprises an identification component configured to identify a SOA shared service that is in need of a revision; and a revision component configured to develop a revision procedure to address the SOA shared service, and implement the revision procedure for the SOA shared service.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for managing a SOA shared service. It should be understood that any other computers implemented under the present invention may have different components/software, but will perform similar functions. As shown, computer system 104 includes a processing unit 106, memory 108 for storing a service management tool 153, a bus 110, and device interfaces 112.

Processing unit 106 collects and routes signals representing outputs from external devices 115 (e.g., a keyboard, a pointing device, a display, a graphical user interface, etc.) to service management tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating service management tool 153, which is stored in memory 108 and/or storage system 116. While executing computer program code, processing unit 106 can read and/or write data to/from memory 108, storage system 116, and a services registry 117. Services registry 117 stores a plurality of SOA shared services and associated metadata, as well as rules against which the metadata is compared to locate, update, and store SOA shared services. Storage system 116 and services registry 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
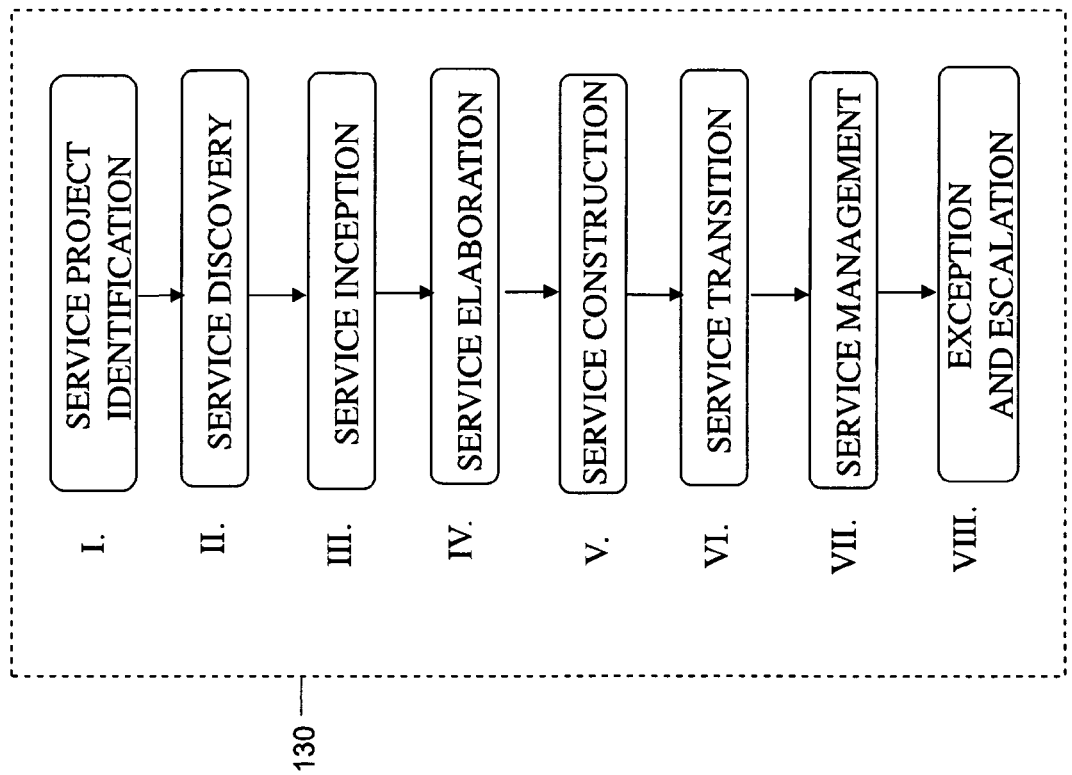
FIG. 2 shows a flow diagram of a SOA services lifecycle management process.

Implementation 100 and service management tool 153 operate within a broader SOA services lifecycle management process (SLMP) 130, shown in FIG. 2, which identifies, evaluates, implements, and manages a SOA shared service. SOA SMLP 130 provides guidance for managing the entire lifecycle of a shared service(s) within an enterprise. Specifically, SOA SLMP 130 of the present invention includes new and distinct roles, governance checkpoints, increased collaboration requirements, and new decision control points. SOA SMLP 130 takes an extended view in identifying the various touch-points inside and outside of the organization to plan, build and manage shared services. The initial processes starts with the identification of a business initiative(s) (e.g., a business need) having the potential of being a shared service project candidate. The overall set of processes ends with the rollout of shared services fulfilling the identified business initiative, as well as management across its entire life.

SOA SLMP 130 of the present invention consists of the following distinct processes and associated methodologies:

I. New Service Project Identification—the goal of this phase is to evaluate and identify a SOA shared services opportunity (i.e., a business need), and to determine if the SOA shared services opportunity can be met through the use of SOA shared services.

II. Service Discovery—the goal of this phase is to complete the Discovery phase for a project that has been identified as a potential SOA services candidate project.

III. Service Inception—the goal of this phase is to gather the high level requirements for the SOA shared services that will be developed as part of the potential SOA services candidate project.

IV. Service Elaboration—the goal of this phase is to further define the high level requirements from the Inception phase into detailed requirements to complete the service solution design and prepare for the build phase.

V. Service Construction—the goal of this phase is to develop the integration components and integrate the SOA shared services components per the design guidelines while meeting/exceeding the necessary quality requirements so that the services can be deployed for general use.

VI. Service Transition—the goal of this phase is to transition the SOA shared services developed in the Construction phase to the operations group that will be responsible for ongoing SOA shared service maintenance.

VII. Service Management—the goal of this phase is to manage the SOA shared services once they have been transitioned to the operations team that will be responsible for ongoing SOA shared service maintenance.

VIII. Exception and Escalation—the goal of this phase is resolve issues that occur during the SOA services lifecycle process in an expedient manner.

Each of the above processes is a complete methodology that can be implemented independently since they define key stakeholders, affected processes, and touch-points throughout the organization. It will be appreciated that each of the above listed SOA processes are non-limiting examples of the functionality and operation of possible implementations of systems, methods and computer program products according to various embodiments of the present invention. In this regard, each process (I-VIII) may represent a module, segment, or portion of code, which comprises one or more executable instructions for implementing the specified logical function(s) of SOA SLMP 130, as shown in FIG. 2. It should also be noted that, in some alternative implementations, the functions noted in SOA SLMP 130 may occur out of the order listed above in processes I-VIII. For example, two processes shown in FIG. 2 in succession may, in fact, be executed substantially concurrently. It should also be noted that, in another alternative embodiment, additional or fewer process steps may be included in SOA SLMP 130. Further, each process of the flowchart of FIG. 2 can be implemented by special purpose hardware-based systems that perform the specified functions or acts, or combinations of special purpose hardware and computer instructions.

Figure 3:
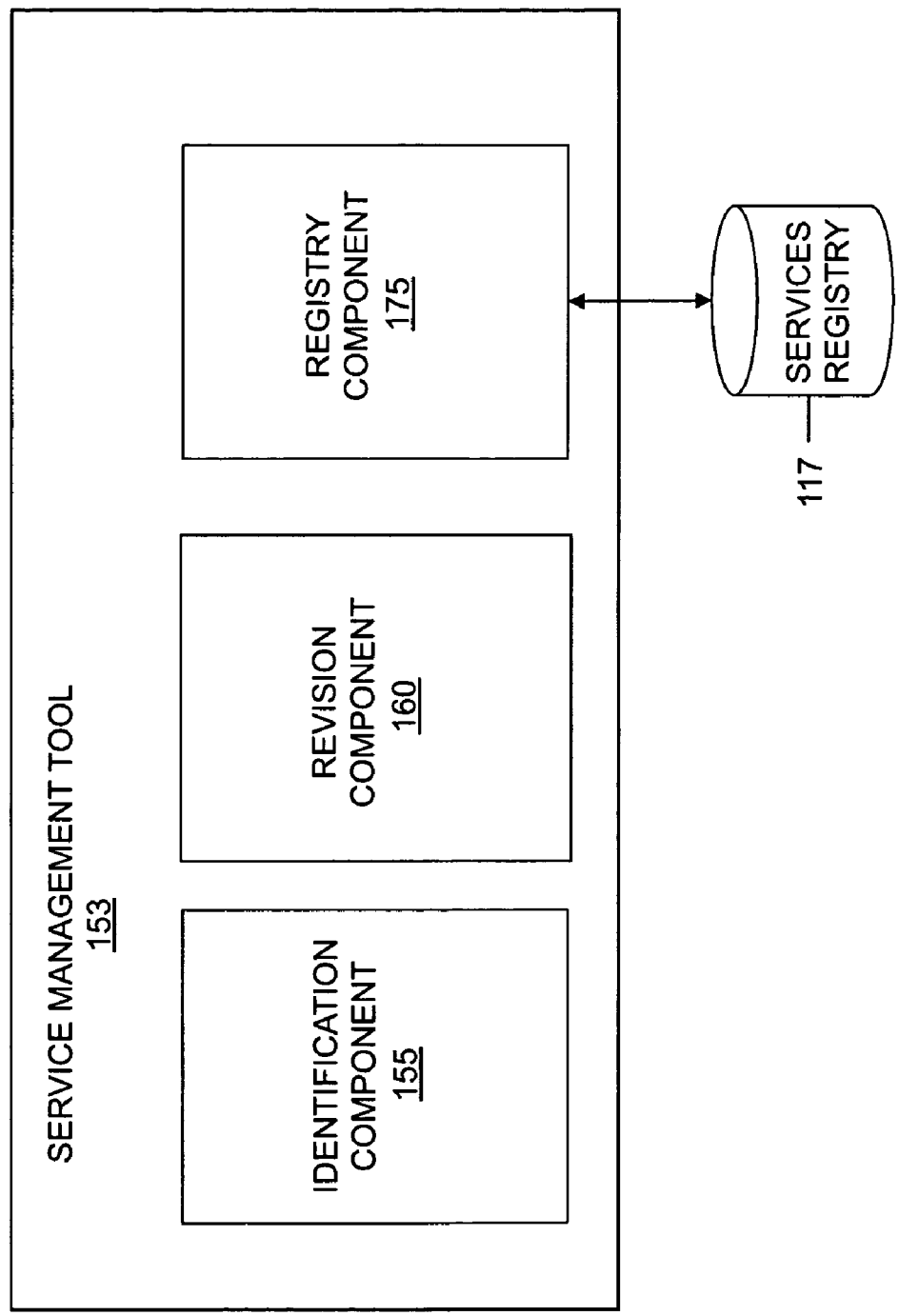
FIG. 3 shows a service management tool that operates in the environment shown in FIG. 1.

FIG. 3 shows a more detailed view of service management tool 153, which manages a SOA shared service that has been transitioned from the construction phase. As shown, service management tool 153 comprises an identification component 150 configured to identify a SOA shared service that needs to be revised for any number of reasons (e.g., no longer effective, operating incorrectly, etc.). Specifically, in one embodiment, identification component 150 is configured to perform at least one of the following: identify a SOA shared service that requires a modification, identify a SOA shared service that is operating improperly, or identify a SOA shared service that is no longer beneficial. To accomplish this, a registrar (not shown) scans services registry 117 for SOA shared services that have completed the service construction and transition phases, and are in need of a revision.

Next, a revision component 160 receives these SOA shared services and develops a revision procedure to address the SOA shared service that is need of a revision. In one embodiment, the SOA shared services identified as being in need of a revision are sent to an SOA enablement group (e.g., a committee or group of individuals within an organization, or a module, segment, or portion of code, etc.), which evaluates the SOA shared service and the proposed revision procedure. During evaluation, SOA enablement group and revision component 160 are configured to identify a set (i.e., one or more) of entities (e.g., consumers, providers, technical teams/groups, et.) associated with the SOA share service that needs to be revised. Revision component 160 is configured to analyze an impact of the revision procedure on the SOA shared service and the set of entities associated with the SOA shared service. Based on this analysis, revision component 160 is configured to implement the revision procedure for the SOA shared service. In one embodiment, the revision procedure comprises at least one of the following: modifying the SOA shared service, or discontinuing the SOA shared service, as will be described and shown in further detail in FIGS. 4-6.

Figure 4:
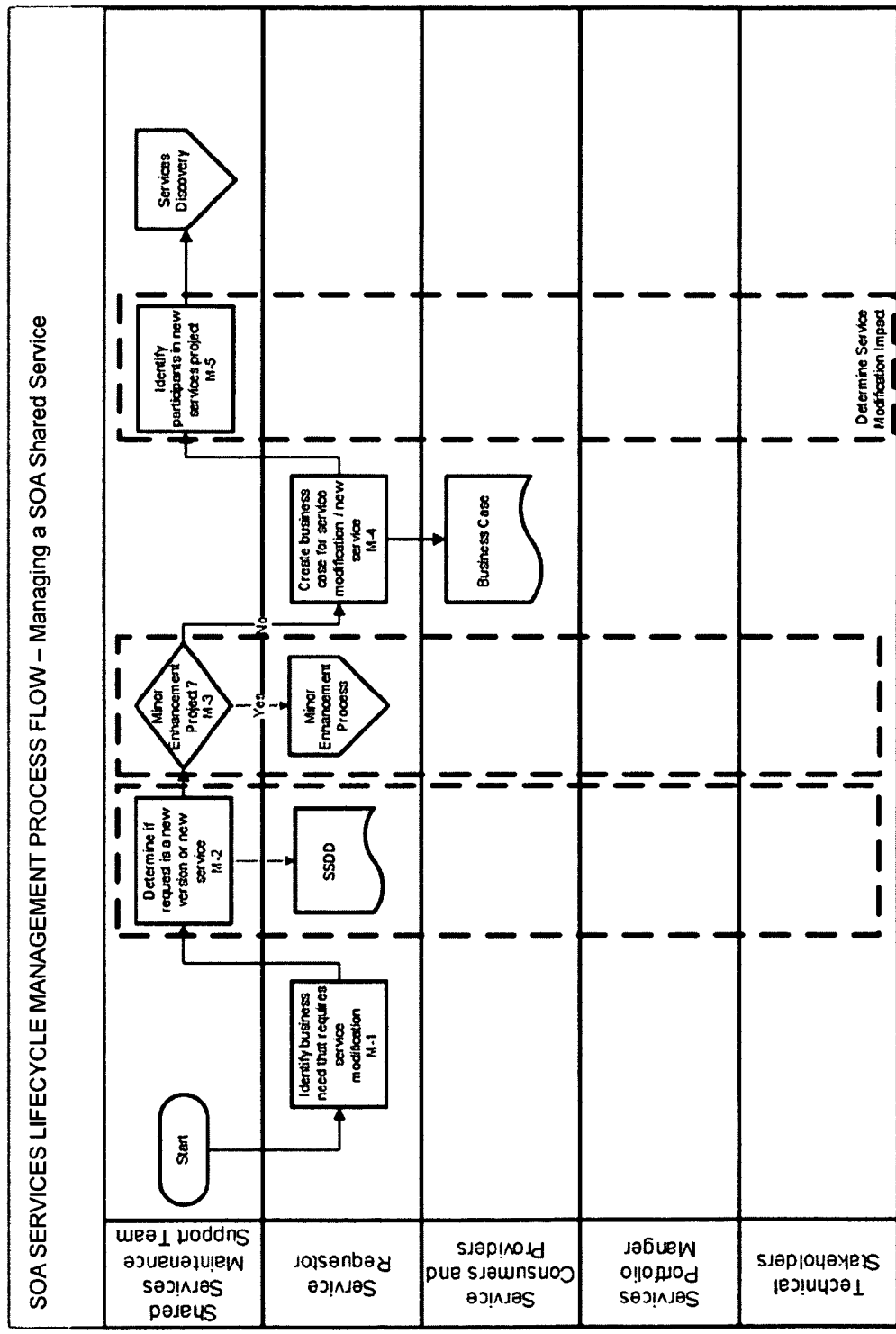
FIG. 4 shows a flow diagram of a SOA services lifecycle management process for managing a SOA shared service.

Referring first to FIG. 4, a SOA services lifecycle management process (SLMP) flow 170 for managing a modification to a SOA shared service will be described in further detail. As shown, SOA SLMP flow 170 begins by identifying a SOA shared service that needs to be revised, i.e., by requesting a modification to an existing service, at modification-1 (M-1). At M-1, one of the service stakeholders (e.g., consumer, provider, technical group, etc.) or the SOA enablement group identifies the need to modify an existing service that has been deployed to production. Next, a revision procedure is developed to address the SOA shared service that needs to be revised. To accomplish this, it is first determined at M-2 whether the request for the modification is a new version of the existing SOA shared service, or a new SOA shared service. The service history is analyzed to determine if any versions of the SOA shared service have been previously created. For example, if less than two versions of the service have been created for the existing SOA shared service, and if a modification can be developed that is backwards compatible to the existing service (i.e., the existing service can receive, read, view or play the standards/formats of the modification), then a modified version of the SOA shared service should be created. If two versions have already been created, or the modification is not backwards compatible, then a new SOA shared service should be developed. If a SOA shared service modification will be created, a shared service design document (SSDD) for that SOA shared service is modified/updated to reflect the changes created by the modification. If a new service is required, the service is entered into services registry 117. To accomplish this, service management tool 153 further comprises a registry component 175 (FIG. 3) configured to update the status of the SOA shared service in services registry 117.

In the case that a modified version of the existing SOA shared service is to be developed, it is determined at M-3 whether the SOA shared service modification is a minor enhancement (i.e., relatively simple and inexpensive). If the modified SOA shared service is a minor enhancement, SLMP flow 170 proceeds to a minor enhancement process, where the modified SOA shared service is further developed under guidelines established for minor enhancement projects. If the modified SOA shared service is not a minor enhancement, SLMP flow 170 proceeds to M-4, where a business case for the SOA shared service modification is created. At M-4, a business plan/case is created, which identifies why the existing SOA shared service should be modified.

Next, SLMP flow 170 identifies a set of entities associated with the SOA shared service, and analyzes an impact of the revision procedure (i.e., modification) on the SOA shared service and the set of entities associated with the SOA shared service. As shown at M-5, each participant (e.g., consumer, provider, technical stakeholder group(s)) that should be included in the project team to develop the service modification is identified, and the impact to each of those participants based on the SOA shared service modification is determined. SLMP flow 170 then implements the revision procedure for the SOA shared service, in this case, by delivering the modified SOA shared service to the service transition phase VI (FIG. 2).

Figure 5:
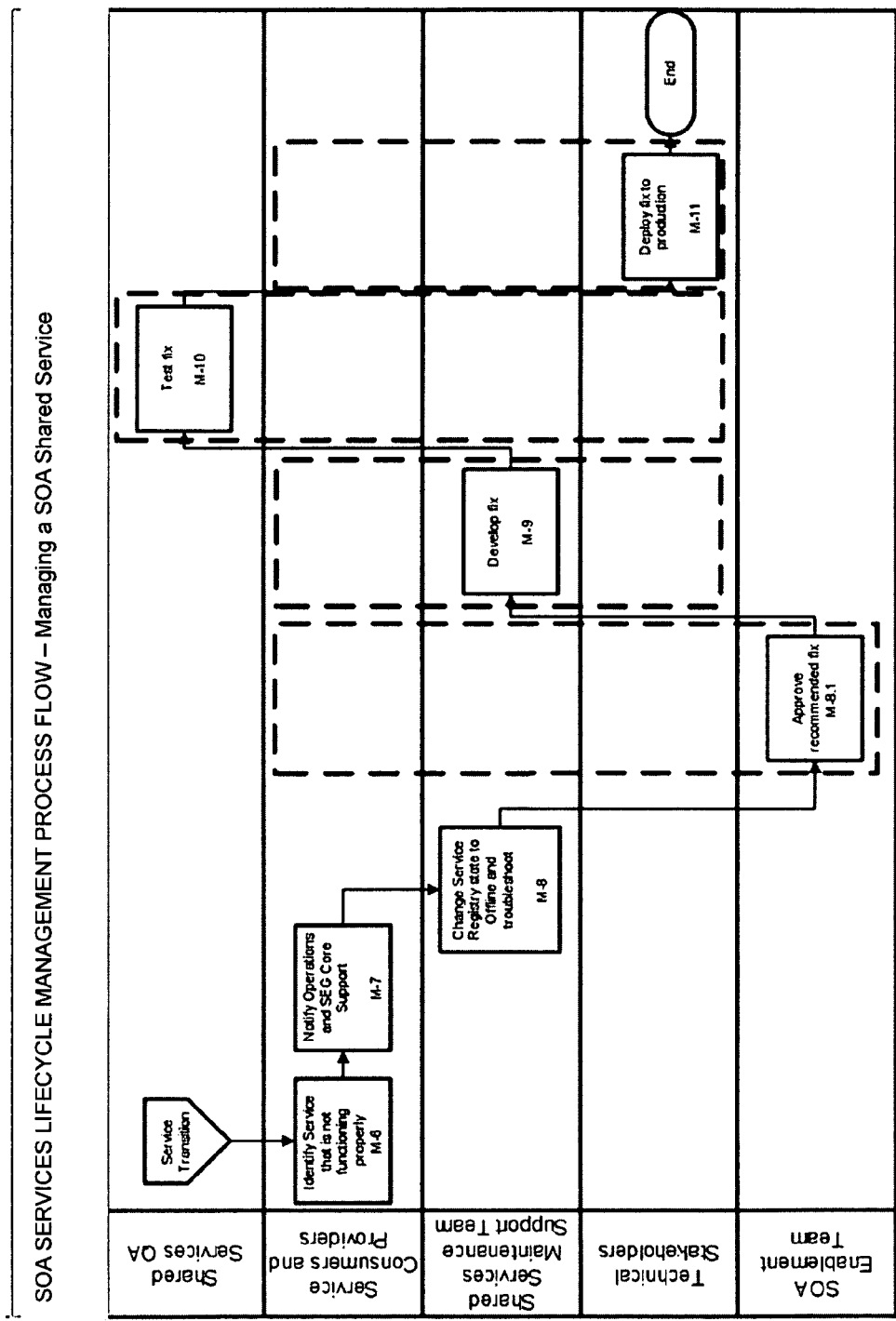
FIG. 5 shows a flow diagram of a SOA services lifecycle management process for managing a SOA shared service.

Referring now to FIG. 5, a SOA services lifecycle management process (SLMP) flow 180 for managing a modification to a SOA shared service that is functioning improperly will be described in further detail. As shown at M-6, SLMP flow 180 identifies SOA shared services that are no longer functioning properly or that are no longer operating at all. At M-7, an operations group and the SOA enablement group are notified. In one embodiment, the entity identifying the defect notifies the operations group as part of the normal operations process. From there, the operations group will notify the SOA enablement group as part of the normal operating process as well. At M-8, the state of the SOA shared service is changed in services registry 117 (FIG. 1) to "offline" and troubleshooting begins. In this step, the SOA shared service is confirmed as not working properly, and the malfunctioning SOA shared service is analyzed to identify a potential resolution to the malfunction. At M-8.1, the recommended fix is approved/denied based on a review of the potential resolution for the malfunction. In this step, a determination is made whether or not to proceed with development of the resolution.

Next, at M-9, the potential fix is developed. Here, the non-functioning service is analyzed to determine the cause of the defect and develop a potential fix for the SOA shared service. The potential fix is then tested at M-10. Here, the potential fix is tested for the SOA shared service to validate that the SOA shared service corrects the defect identified. At M-11, the fix is deployed to production. In this step, a deployment plan is developed and the fix is deployed to the production environment.

Figure 6:
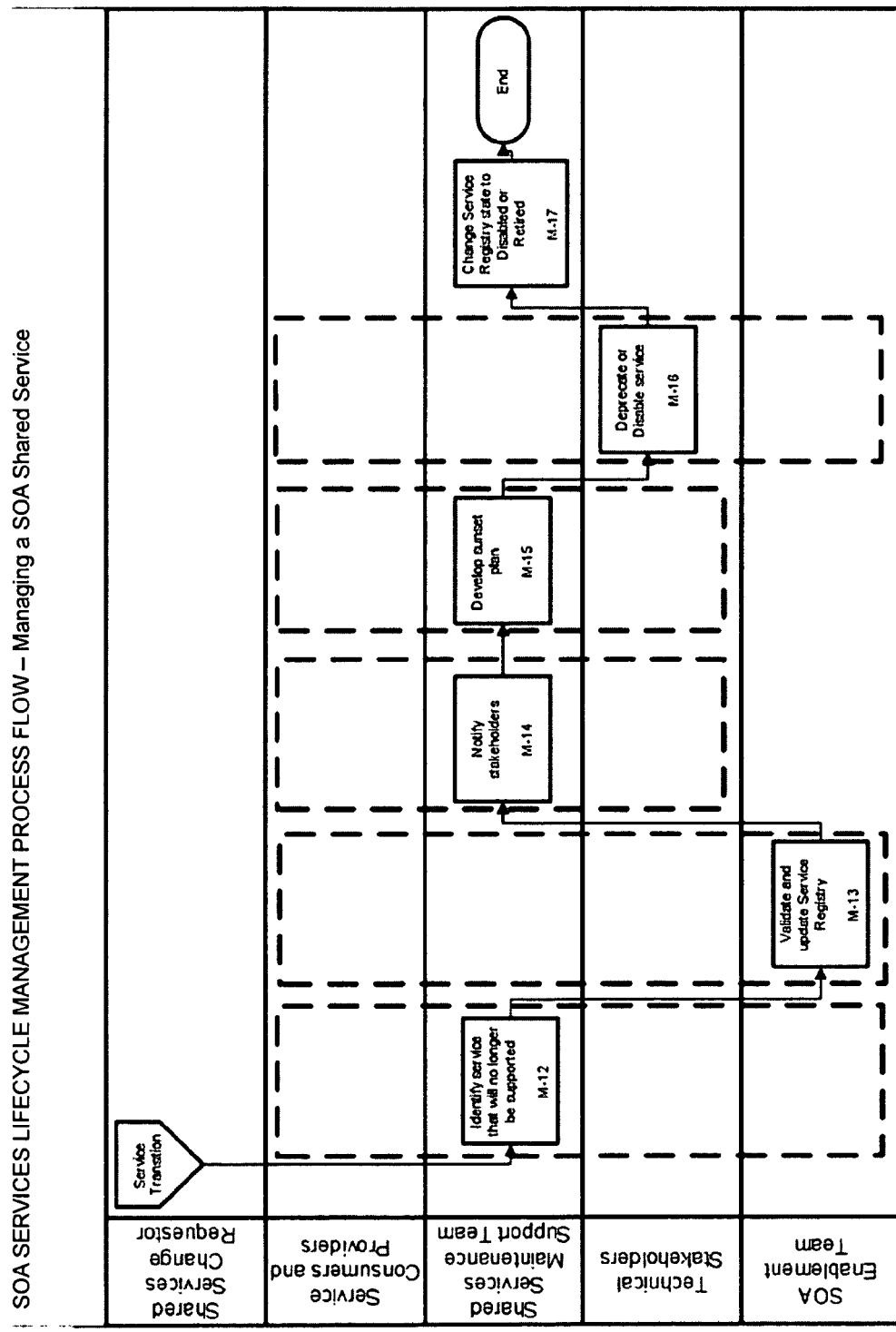
FIG. 6 shows a flow diagram of a SOA services lifecycle management process for managing a SOA shared service.

Referring now to FIG. 6, a SOA services lifecycle management process (SLMP) flow 190 for managing a SOA shared that service that is no longer beneficial will be described in further detail. At M-12, a SOA shared service that is no longer to be supported is identified. At M-13, service registry 117 is updated and a validation is made that the SOA shared service will no longer be supported and the service is to be discontinued. The status of the SOA shared service is changed to "potentially disabled" or "soon to be retired" in services registry 117 based on the action that will be taken. Next at M-14, all the various entities are notified. Here, current stakeholders are notified that the existing service will be disabled or depreciated. This may happen automatically through services registry 117 when there is a status change. Participants from other stakeholder communities are also notified so that they may participate in meetings to plan the SOA shared service disablement/depreciation. At M-15, a "sunset plan" is developed to plan to disable or update the SOA shared service. At M-16, the SOA shared service is disabled/retired. Finally, at M-17, service registry 117 state is changed to "disabled" or "retired."

As shown, FIGS. 4-6 detail the organizational roles and responsibilities for each entity in each SOA SLMP flow. For example, SOA SLMP flow 170 (FIG. 4) identifies shared service roles indicating the primary and secondary (if applicable) roles for each entity (i.e., shared services maintenance support team, service requester, service consumers and providers, etc.) at each process of the service management phase. For example, at M-2, the shared services maintenance support team is considered to have primary responsibility for determining if the request is a new version or a new service. All the other entities (i.e., service requester, service consumers and providers, etc.) are considered to have secondary responsibility. This may mean that the shared services maintenance support team is given the authority and accountability to make the determination at M-2. In this regard, SOA SLMP flow 170 governs the rules of engagement between the various entities. SOA SLMP flow 170 provides integration points between the various entities across different organizational domains involved in the development, deployment, transition, and management of SOA shared services, as discussed herein.

It will be appreciated that SOA SLMP flows 170, 180 and 190 of FIGS. 4-6, respectively, represent possible implementations of a process flow for managing SOA shared services, and that other process flows are possible within the scope of the invention. The SOA SLMP flows illustrate the architecture, functionality, and operation of possible implementations of systems, methods and computer program products according to various embodiments of the present invention. In this regard, each portion of the flowchart may represent a module, segment, or portion of code, which comprises one or more executable instructions for implementing the specified logical function(s). It will also be noted that each block of flowchart illustration can be implemented by special purpose hardware-based systems that perform the specified functions or acts, or combinations of special purpose hardware and computer instructions.

Further, it can be appreciated that the methodologies disclosed herein can be used within a computer system to provide management of a SOA shared service, as shown in FIG. 1. In this case, service management tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for managing a SOA shared service. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for managing a service oriented architecture (SOA) shared service comprising:
   identifying a SOA shared service that is in need of a revision;
   developing a revision procedure to address the SOA shared service by performing the following:
      analyzing a service history to determine if a prior version of the SOA shared service exists;
      determining if the prior version of the SOA shared service is compatible to operate with a set of standards and formats of the revision procedure; and implementing the revision procedure for the SOA shared service based on the developing, whereby a modified version of the SOA shared service is created in the case that the prior version of the SOA shared service is compatible to operate with the set of standards and formats of the revision procedure, and a new SOA shared service is developed in the case that the prior version of the SOA shared service is incompatible to operate with the set of standards and formats of the revision procedure.

2. The method according to claim 1, the identifying comprising at least one of the following: identifying a SOA shared service that requires a modification, identifying a SOA shared service that is operating improperly, or identifying a SOA shared service that is no longer beneficial.

3. The method according to claim 1, the revision procedure comprising at least one of the following: modifying the SOA shared service, or discontinuing the SOA shared service.

4. The method according to claim 1, the developing further comprising identifying a set of entities associated with the SOA shared service; and
analyzing an impact of the revision procedure on the SOA shared service and the set of entities associated with the SOA shared service.

5. The method according to claim 1 further comprising updating a status of the SOA shared service in a services registry.

6. A system for managing a service oriented architecture (SOA) shared service comprising:
at least one processing unit;
memory operably associated with the at least one processing unit; and
a service management tool storable in memory and executable by the at least one processing unit, the service management tool comprising:
an identification component configured to identify a SOA shared service that is in need of a revision; and
a revision component configured to:
develop a revision procedure to address the SOA shared service by performing the following:
analyzing a service history to determine if a prior version of the SOA shared service exists;
determining if the prior version of the SOA shared service is compatible to operate with a set of standards and formats of the revision procedure; and
implement the revision procedure for the SOA shared service based on the developing, whereby a modified version of the SOA shared service is created in the case that the prior version of the SOA shared service is compatible to operate with the set of standards and formats of the revision procedure, and a new SOA shared service is developed in the case that the prior version of the SOA shared service is incompatible to operate with the set of standards and formats of the revision procedure.

7. The service management tool according to claim 6, the identification component further configured to perform at least one of the following: identify a SOA shared service that requires a modification, identify a SOA shared service that is operating improperly, or identify a SOA shared service that is no longer beneficial.

8. The service management tool according to claim 6, the revision component further configured to perform at least one of the following: modify the SOA shared service, or discontinue the SOA shared service.

9. The service management tool according to claim 6, the revision component further configured to:
identify a set of entities associated with the SOA shared service; and
analyze an impact of the revision procedure on the SOA shared service and the set of entities associated with the SOA shared service.

10. The service management tool according to claim 6 further comprising a registry component configured to update a status of the SOA shared service in a services registry.

11. A computer-readable storage device storing computer instructions, which when executed, enables a computer system to manage a service oriented architecture (SOA) shared service, the computer instructions comprising:
identifying a SOA shared service that is in need of a revision;
developing a revision procedure to address the SOA shared service by performing the following:
analyzing a service history to determine if a prior version of the SOA shared service exists;
determining if the prior version of the SOA shared service is compatible to operate with a set of standards and formats of the revision procedure; and
implementing the revision procedure for the SOA shared service based on the developing, whereby a modified version of the SOA shared service is created in the case that the prior version of the SOA shared service is compatible to operate with the set of standards and formats of the revision procedure, and a new SOA shared service is developed in the case that the prior version of the SOA shared service is incompatible to operate with the set of standards and formats of the revision procedure.

12. The computer-readable storage device according to claim 11, the computer instructions for the identifying further comprising at least one of the following: identifying a SOA shared service that requires a modification, identifying a SOA shared service that is operating improperly, or identifying a SOA shared service that is no longer beneficial.

13. The computer-readable storage device according to claim 11, the revision procedure comprising at least one of the following: modifying the SOA shared service, or discontinuing the SOA shared service.

14. The computer-readable storage device according to claim 11, the computer instructions for developing further comprising:
identifying a set of entities associated with the SOA shared service; and
analyzing an impact of the revision procedure on the SOA shared service and the set of entities associated with the SOA shared service.

15. The computer readable storage device according to claim 11, the computer instructions further comprising updating a status of the SOA shared service in a services registry.

16. A method for deploying a service management tool for use in a computer system that provides management of a service oriented architecture (SOA) shared service, comprising:
providing a computer infrastructure operable to:
identify a SOA shared service that is in need of a revision;
develop a revision procedure to address the SOA shared service by performing the following:
analyzing a service history to determine if a prior version of the SOA shared service exists;
determining if the prior version of the SOA shared service is compatible to operate with a set of standards and formats of the revision procedure; and implement the revision procedure for the SOA shared service based on the developing, whereby a modified version of the SOA shared service is created in the case that the prior version of the SOA shared service is compatible to operate with the set of standards and formats of the revision procedure, and a new SOA shared service is developed in the case that the prior version of the SOA shared service is incompatible to operate with the set of standards and formats of the revision procedure.

17. The method according to claim 16, the computer infrastructure operable to identify further operable to perform at least one of the following: identify a SOA shared service that requires a modification, identify a SOA shared service that is operating improperly, or identify a SOA shared service that is no longer beneficial.

18. The method according to claim 16, the revision procedure comprising at least one of the following: modifying the SOA shared service, or discontinuing the SOA shared service.

19. The method according to claim 16, the computer infrastructure operable to develop further operable to:
   identify a set of entities associated with the SOA shared service; and
   analyze an impact of the revision procedure on the SOA shared service and the set of entities associated with the SOA shared service.

20. The method according to claim 16, the computer infrastructure further operable to update a status of the SOA shared service in a services registry.

* * * * *